Jan. 9, 1962  F. J. CORPORON  3,016,456
APPARATUS FOR IDENTIFYING RAILROAD CARS
Filed March 19, 1957
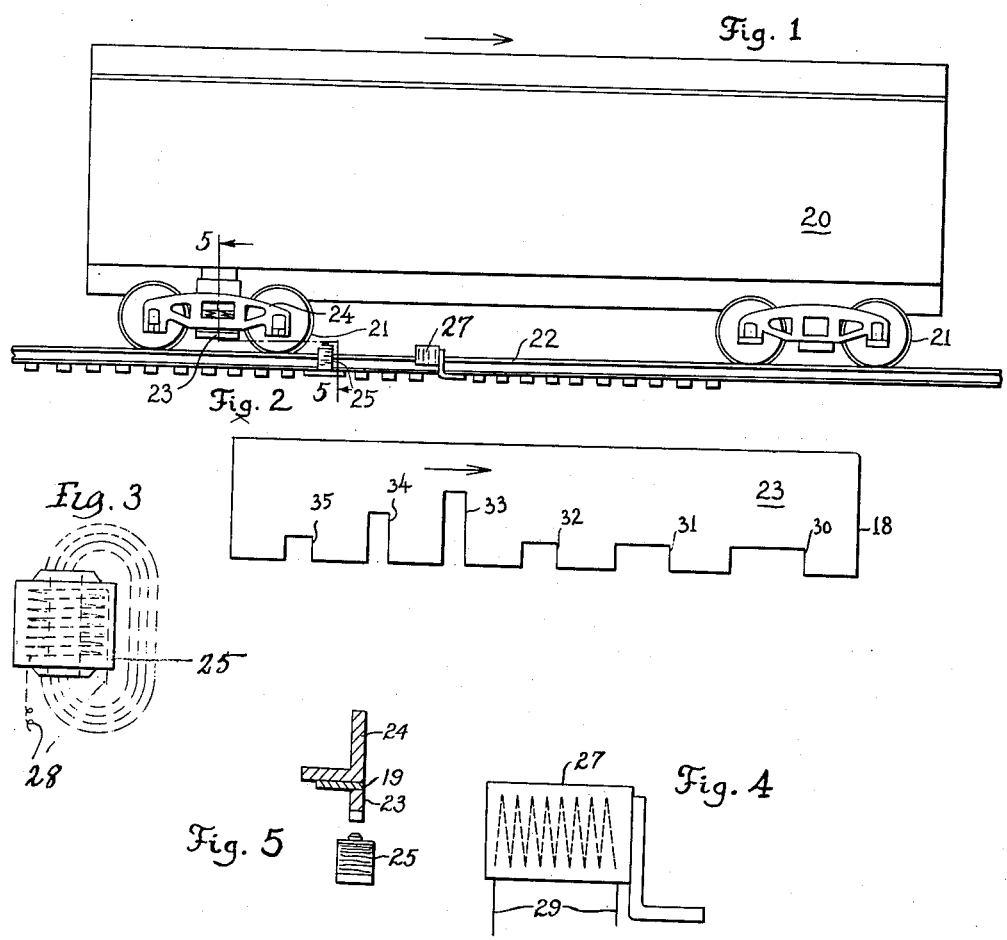
INVENTOR.
Frederic J. Corporon
BY
Fred Gerlach
His Attorney.

United States Patent Office 3,016,456
Patented Jan. 9, 1962

3,016,456
APPARATUS FOR IDENTIFYING RAILROAD CARS
Frederic J. Corporon, 308 Earl Road,
Michigan City, Ind.
Filed Mar. 19, 1957, Ser. No. 647,122
4 Claims. (Cl. 246—2)

The invention relates to apparatus for producing signals from moving vehicles, such as the cars of a railway train travelling on a railway track.

The identification of railroad freight cars is the subject of much effort by the railroad industry. Current railroad operating practice requires that each individual freight car be identified positively each time it enters or leaves a railroad freight yard. Heretofore, various systems have been devised to facilitate such identification, the majority of such systems being of a visual nature wherein the usual serial or identification numbers of the various freight cars are replaced by code designations which afford better visibility, are more readily understandable than sequential numerals, offer a wider variety of information due to the particular code employed, and otherwise offer visual advantages that are not attainable with sequential numeral identification. Recent efforts to facilitate identification of railroad freight cars have resulted in a number of automatically operable identification systems employing electronic signalling devices by means of which coded information may be automatically obtained each time a freight car passes a given point on the roadbed.

These systems are relatively complicated, some of them involving the use of electrically powered transmitters on the freight cars and decoding receivers at a fixed location to receive the coded information and decode the same. Other such systems employ the principle of tuned radio frequency coils, one on each freight car and one on the roadbed so that when the tuned coils move into proximity with each other, signals conveying the desired information will be set up. Systems which operate upon the first-mentioned principle are expensive in that they require the use of battery-powered equipment such as amplifiers or other electronic units on the freight cars. Systems which operate upon the tuned frequency principle also require sources of energizing current such as batteries which are carried on the freight cars to feed the tuned coils associated with the system. All such systems therefore require frequent maintenance and battery replacement. Another limitation possessed by such automatic systems of freight car identification is the fact that with either type of system, wide band differentiation between signals is required so that the signal for any given car may be positively distinguished from the signals for another car which utilizes the next adjacent frequency band, thus avoiding malfunctioning of the decoding relay mechanism. With such wide band differentiation being required, the available channels for transmission of information are limited and are grossly inadequate to accommodate, for example, the nearly two million freight cars in daily use in the United States and Canada.

A still further limitation that is attendant upon the use of automatic freight car identification systems utilizing electronic transmitting and receiving equipment, or tuned radio circuits, resides in the fact that such systems are affected by weather conditions such as humidity, temperature and the like, thus giving rise to malfunctioning of the equipment during inclement weather.

The present invention is designed to overcome the above-noted limitations that are attendant upon the use of automatic systems of the character briefly outlined above, and toward this end, it contemplates the provision of an extremely simple and inexpensive information-transmitting system which, insofar as car-installed equipment is concerned, requires no source of energizing current and, furthermore, after its initial installation on a freight car, requires no further maintenance, even to the point of dispensing with periodic inspection.

The provision of a system of this character being among the principal objects of the invention, another and important object is to provide a system wherein a sufficient number of "channels" for communication of intelligence are made available so that they may be coded infinitely to provide a sufficient number of freight car designations for all existing freight cars on a nation-wide basis.

Briefly, in carrying out the above-noted objects, the invention contemplates the provision of a system wherein a permanently magnetized fixed member on each freight car passes coded information by magnetic induction to a receiver positioned on the roadbed, the relative motion between the magnetized member and the receiver, as the member moves past the receiver, initiating the signals which comprise the coded information. The magnetized member, being the only equipment associated with the freight car may thus be applied to the car at the time it is manufactured and it may remain permanently with the car until the latter is junked.

Other objects and advantages of the invention, not at this time enumerated will become more readily apparent as the following description ensues.

The invention consists in the several novel features hereinafter set forth and more particularly defined at the conclusion hereof.

In the drawings:

FIG. 1 is a side elevational view of a railway freight car, showing the same operatively mounted on a track-supporting roadbed, with the identification system of the present invention being operatively applied to the car and roadbed respectively;

FIG. 2 is a side elevational view of a magnetizable member employed in connection with the present invention;

FIG. 3 is a side elevational view of a magnetizing coil assembly employed in connection with the present invention;

FIG. 4 is a side elevational view of a sensing coil employed in connection with the invention; and FIG. 5 is an enlarged sectional view taken substantially along the line 5—5 of FIG. 1.

The invention is exemplified with railway equipment comprising: a railway car 20 having the usual wheel-trucks 21 of any suitable construction for travel on the rails 22 of a track roadbed.

The apparatus of the invention includes: a magnetic member which is preferably in the form of a flat steel plate or bar 23 which extends in a direction parallel with the travel of the car and is fixedly mounted under the side-frame 24 of one of the trucks 21; a magnetizing coil 25 fixedly mounted on a roadbed at a sensing station and operatively connected by conductors 18 to a source of current supply (not shown) by means of which current is applied to the coil 25 to establish a magnetic field such as has been shown at 18 in the vicinity of the coil; and an induction coil 27 fixedly mounted on the roadbed rearwardly of the coil 25 relative to the direction of travel of the car in a position wherein it may be traversed by the magnetized bar 20, the coil being connected to conductors 29 which transmit signals from the coil to a suitable decoding signalling or recording apparatus.

The bar 23 is secured to the bottom of the side-frame 24 and, if desired, may be insulated from said frame by a strip 19 of suitable insulating material to aid in confining the magnetic field mainly to said bar.

The bar 23 is provided with means for variably distorting magnetic flux in different zones of its magnetic field sequentially in the direction of travel of the car for inducing impulses in coil 27 to produce signals for conduction or transmission to a point where the signals are to be amplified and decoded or otherwise rendered intelligible.

The steel bar 23 is supported relative to the roadbed with the plane thereof extending vertically. The lower edge of the bar is provided with a series of spaced notches or indentations 30, 31, 32, 33, 34 and 35, reading from right to left as viewed in FIG. 2. These notches vary according to the signals which are to be successively transmitted from the bar 23 to the coil 27 both as regards their width and their depth, the notches 30, 31 and 32 being of equal depth but of diminishing width and the notches 33, 34 and 35 being of equal width but of diminishing depth, reading from right to the left. The purpose of the various notches is to afford magnetic fields of varying intensity in and around the lower regions of the bar 23 in the respective longitudinal zones of the bar in which the notches are disposed.

The magnetizing coil 25 and the signalling coil 27 are positioned on the roadbed at spaced points therealong in such a manner that, upon forward travel of the car 20, the bar 23 will first physically pass through the magnetic field 18 of the magnetizing coil 25 and thereafter the signalling coil 27 will be traversed by the various magnetic fields of varying intensity produced by the previously magnetized bar 23.

Referring now to FIG. 2, passing of the bar 23 through the relatively strong magnetic field 18 of the magnet 25 will produce a series of local magnetized zones in the bar. These localized zones will correspond in number to the number of notches provided in the lower edge of the bar and the intensities of the magnetic fields associated with the various zones of magnetization will vary according to the character of the notches.

Inasmuch as the number of coil turns in the signalling coil 27 in constant, the number of lines of magnetic flux of any given magnetic field such as may be obtained, for example, from a permanent magnet, which are intercepted by the coil in passing determines the number of flux linkages which are created when the coil passes through the magnetic field, one flux linkage being equal to one line of flux passing through or linking with one turn of the coil. The number of flux linkages, of course, determines the magnitude of the induced voltage in the coil. Therefore, upon forward movement of the freight car 20 along the rails 22, as the signalling coil 27 is traversed successively by the magnetic fields of the notches 30, 31, 32, 33, 34 and 35 respectively, varying flux linkages, and consequently, varying voltages will be induced in the conductors 29 leading from the coil 27.

In practice, the bars 23 on the trucks of the various cars of a train are provided with individually different designations and the bars 23 are each provided with notches variously spaced and individually adapted by different depths and widths to create magnetic fields of different intensities to produce signals corresponding to the digits of the various different designations. The apparatus is simple, can be installed at a low cost, and requires the minimum service in maintenance.

The invention is not to be understood as restricted to the details set forth since these may be varied within the scope of the appended claims without departing from the spirit and scope of the invention.

Having thus described the invention what I claim as new and desire to secure by Letters Patent is:

1. Apparatus for producing vehicle identification signals from a railway car moving on a roadbed, said apparatus comprising an elongated bar of a magnetizable material fixedly mounted on the vehicle and extending longitudinally thereof, said bar having a straight edge having formed therein a series of longitudinally spaced notches which vary in shape and which are designed, when the bar is magnetized, to produce in the vicinity of the notches, respective magnetic fields which vary in intensity, a stationary signalling coil fixedly positioned on the roadbed at a sensing zone and in the path of movement of the fields produced by said bar for producing sequential impulses having voltage characteristics corresponding to the magnitudes of said field intensities, and a magnetizing coil having a magnetic field positioned in the path of movement of said bar, said magnetizing coil being disposed on the roadbed in advance of the signalling coil relative to the direction of travel of the vehicle, whereby said bar, upon forward movement of the vehicle will first encounter said magnetizing coil and become permanently magnetized, and thereafter encounter said sensing coil for signal producing purposes.

2. Apparatus for producing vehicle identification signals corresponding to digital designations assigned to a vehicle moving on a roadbed, said apparatus comprising a horizontally elongated bar formed of magnetizable material, fixedly mounted on the vehicle and extending longitudinally of the same, said bar having formed therein a series of longitudinally spaced notches which open onto and extend inwardly from one longitudinal edge of the bar, there being one notch for each digital designation, said notches varying in depth and being designed, when the bar is magnetized, to produce in the vicinity of the notches, respective magnetic fields which vary in intensity in proportion to the depth of the respective notches, and a stationary coil fixedly mounted on the roadbed at a sensing zone and in the path of movement of the fields produced by said bar, said coil being inductively responsive to the successive fields encountered thereby and traveling thereacross for producing sequential impulses varied by the differences in said field intensities, whereby impulses of varying voltage characteristics are induced in said coil.

3. Apparatus for producing vehicle identification signals corresponding to digital designations assigned to a vehicle moving on a roadbed, said apparatus comprising a horizontally elongated bar formed of magnetizable material, fixedly mounted on the vehicle and extending longitudinally of the same, said bar having formed therein a series of longitudinally spaced notches which open onto and extend inwardly from one longitudinal edge of the bar, there being one notch for each digital designation, said notches varying in width and being designed, when the bar is magnetized, to produce in the vicinity of the notches, respective magnetic fields which vary in intensity in proportion to the width of the respective notches, and a stationary coil fixedly mounted on the roadbed at a sensing zone and in the path of movement of the fields produced by said bar, said coil being inductively responsive to the successive fields encountered thereby and traveling thereacross for producing sequential impulses varied by the differences in said field intensities, whereby impulses of varying voltage characteristics are induced in said coil.

4. Apparatus for producing vehicle identification signals corresponding to digital designations assigned to a vehicle moving on a roadbed, said apparatus comprising a horizontally elongated bar formed of magnetizable material, fixedly mounted on the vehicle and extending longitudinally of the same, said bar having formed therein a series of longitudinally spaced notches which open onto and extend inwardly from one longitudinal edge of the bar, there being one notch for each digital designation, said notches varying in shape and being designed, when the bar is magnetized, to produce in the vicinity of the notches, respective magnetic fields which vary in intensity in proportion to the shape of the respective notches, and a stationary coil fixedly mounted on the roadbed at a sensing zone and in the path of movement of the fields produced by said bar, said coil being inductively responsive to the successive fields encountered thereby and traveling thereacross for producing sequential impulses varied by the differences in said field intensities, whereby impulses of varying voltage characteristics are induced in said coil.

References Cited in the file of this patent

UNITED STATES PATENTS

| | | |
|---|---|---|
| 1,797,864 | Harlandt | Nov. 24, 1931 |
| 2,493,755 | Ferrill | Jan. 10, 1950 |
| 2,576,424 | Sunstein | Nov. 27, 1951 |
| 2,628,572 | Goff | Feb. 17, 1953 |
| 2,850,249 | Uderstadt | Sept. 2, 1958 |
| 2,877,718 | Mittag | Mar. 17, 1959 |

FOREIGN PATENTS

| | | |
|---|---|---|
| 943,172 | Germany | May 17, 1956 |

OTHER REFERENCES

Popular Science of April 1953, pages 136, 137. Photostat copy in class 340-23.